United States Patent [19]
White

[11] Patent Number: 4,730,637
[45] Date of Patent: Mar. 15, 1988

[54] FLUID LOSS, DAMAGE PREVENTION AND CONTROL SYSTEM

[76] Inventor: F. Grove White, P.O. Box 4, Midlothian, Va. 23113

[21] Appl. No.: 16,866

[22] Filed: Feb. 20, 1987

[51] Int. Cl.$^4$ .................... E03B 7/12; F16L 55/00
[52] U.S. Cl. .................... 137/62; 137/468; 137/487.5; 137/552.7; 137/565; 137/624.2; 137/624.21; 237/80; 340/581; 340/825.06
[58] Field of Search ............ 137/59, 61, 62, 87, 137/357, 459, 468, 486, 487.5, 551, 552.7, 624.11, 624.2, 624.4; 237/80; 340/580, 581, 584, 609, 825.06; 126/420; 364/505, 510, 557; 377/20, 21

[56] References Cited

U.S. PATENT DOCUMENTS

| | | | |
|---|---|---|---|
| 389,096 | 9/1888 | Newman | 137/61 |
| 3,324,458 | 6/1967 | MacArthur | 340/825.06 |
| 3,416,560 | 12/1968 | Bruno | 137/487.5 |
| 3,812,872 | 5/1974 | Bloch et al. | 137/62 |
| 4,180,088 | 12/1979 | Mallett | 137/459 |
| 4,304,989 | 12/1981 | Vos et al. | 377/21 |
| 4,672,990 | 6/1987 | Robillard | 137/59 |

FOREIGN PATENT DOCUMENTS

| | | | |
|---|---|---|---|
| 931043 | 7/1973 | Canada | 137/62 |
| 0046777 | 9/1939 | Netherlands | 137/62 |
| 2074640 | 11/1981 | United Kingdom | 137/62 |
| 2117436 | 10/1983 | United Kingdom | 137/62 |

Primary Examiner—George L. Walton
Attorney, Agent, or Firm—Richard C. Litman

[57] ABSTRACT

The invention relates to a fluid flow monitor and control system which prevents excessive fluid loss and property damage. The invention warns of impending distribution pipe freeze conditions, or ruptures from other causes, shuts off the fluid supply, and vents and drains the piping network under freeze and rupture conditions. Furthermore, the invention shuts off fluid flow if the volume of flow or the velocity exceeds desired norms. An example of its application is as a water main shut-off for residential houses and commercial buildings, it also can be used for industrial processing applications.

8 Claims, 2 Drawing Figures

FLUID LOSS, DAMAGE PREVENTION AND CONTROL SYSTEM

BACKGROUND OF INVENTION

1. Field of Invention

The invention relates to a fluid loss prevention, fluid damage control, and fluid freeze damage prevention system, and more particularly, the invention is directed to an automatic device specifically intended to eliminate and/or minimize property damage and fluid loss arising from malfunctioning fixtures or appliances and ruptured pipes, which are prevalent in sub-freezing temperatures.

This invention further relates to a fluid flow monitoring and control system which when operative will (1) warn of an impending distribution pipe freeze condition, (2) shut off fluid supply, vent and drain the piping network under freeze conditions, and (3) shut off the fluid supply when volume of flow, and/or velocity exceeds desired electronically programmed norms, such as that which results from a ruptured corroded water pipe or ruptured hot water heater.

Fluid loss and fluid damage arising from malfunctioning fixtures, appliances, and ruptured pipes is a rather common occurrence which can happen at any time of the day or on any day of the year. Also, prolonged winter time sub-freezing temperatures often rupture pipes in unheated areas which results in extensive property damage and fluid loss arising from such occurrences.

When using a manual valve operated system, property damage arising from the foregoing cited events can be held to a minimum because the adverse condition can be observed shortly after occurrence and remedial action can be quickly taken by manually shutting off the supply valve. However, these valves are generally located inconveniently, or the location is unknown. Then extensive fluid damage and fluid loss does occur. Furthermore, the damaging fluid flow may occur at night or when the monitored facility such as a house or building is unoccupied even for short periods and hence is unobserved. For example, even when families leave home for vacation, few water systems are shut off, and upon return, the home is found flooded. Also water damage due to freezing pipes occurs frequently while the building is occupied, such as in sprinkler systems, so there is no assurance that any home or building is secure from extensive damage as long as the incoming water valve is on.

The invention can be used for a variety of applications, typically, where fluids are transferred via pipeline systems. It is not limited to use with water systems but can be used with a variety of liquid distribution and process piping systems. Although the invention is especially useful as a water main shutoff to residential homes and commercial buildings, it can also prevent unobserved leaks in any fluid system which can cause extensive damage. The method of construction of the device is more fully described herein.

2. Description of the Prior Art

Of the various prior art fluid flow control and freeze protection devices, U. S. Pat. No. 4,180,088, issued to Mallett, addresses the problems solved by my invention but his device fails to do so with the completeness of this invention. The Mallett system which has to be attended at least twice daily, upon retiring at night and arising in the morning, incorporates a "flow sensor" which shuts off the water supply whenever flow occurs, no matter how minute, when the device is in the "automatic" position.

In the automatic mode the Mallett device makes no allowance for normally expelled water flow when a toilet is flushed; when someone gets a midnight drink of water; or the refrigerator's automatic ice maker calls for water at a very early morning hour. It simply shuts the system off. Furthermore, when a pipe freezes and bursts, it will cause the system to shut down as water flows from the rupture but does not operate to prevent the rupture from occurring. Likewise the piping system does not drain, so those pipes in freeze zones can continue to burst even though the Mallett device has turned off the water supply. Additionally, the Mallett system makes no provisions for electrical failure; the water shuts off since the valves, gas and water, are of types that close when de-energized. This situation can have dire consequences under conditions of prolonged electric power outage because there are no manual by-pass valves parallel to the solenoid valves. Finally, the Mallett system also offers no water damage protection during the day or early evening because the protective system must be inactivated to allow for normal water useage for bathing, washing, flushing and the like.

This patent or known prior uses teach and disclose various types of fluid flow control and freeze protection devices of sorts and of various manufactures, and the like, as well as methods of their construction; but none of them, whether taken singly or in combination, disclose the specific details of the combination of the invention in such a way as to bear upon the claims of the present invention.

SUMMARY OF THE INVENTION

An object, advantage, and feature of the invention is to provide a novel automated fluid flow monitoring and control system that is safe and efficient in use, and that lends itself to easy installation in residential dwellings, commercial buildings, and industrial pipeline systems.

Another object of the invention is directed further to a device providing for the prevention of ruptured pipes from subfreezing temperatures while allowing for normal useage. This is a substantial improvement over existing practices in that a programmable controller is utilized to monitor fluid flow and the system can shut off the fluid supply before a pipe ruptures.

These, together with other objects and advantages of the invention, reside in the details of the process and the operation thereof, as is more fully hereinafter described and claimed. References are made to a drawing forming a part hereof, wherein like numerals refer to like parts throughout.

DESCRIPTION OF THE PREFERRED EMBODIMENT OF THE INVENTION

Figure 1A:
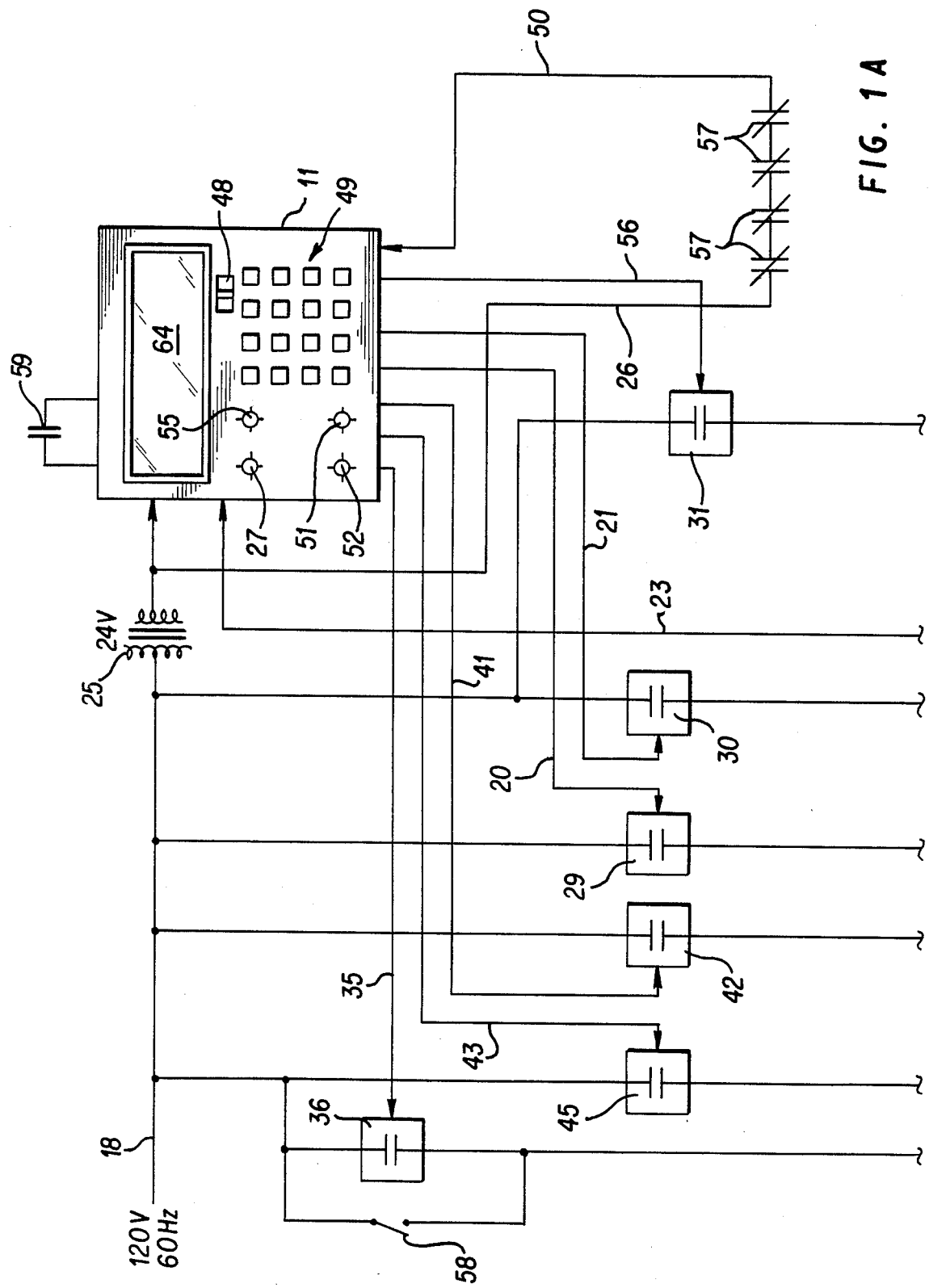
FIGS. 1A and 1B are a schematic diagram of the system illustrating a typical construction of the device according to a preferred embodiment and best mode of the present invention.
Figure 1B:
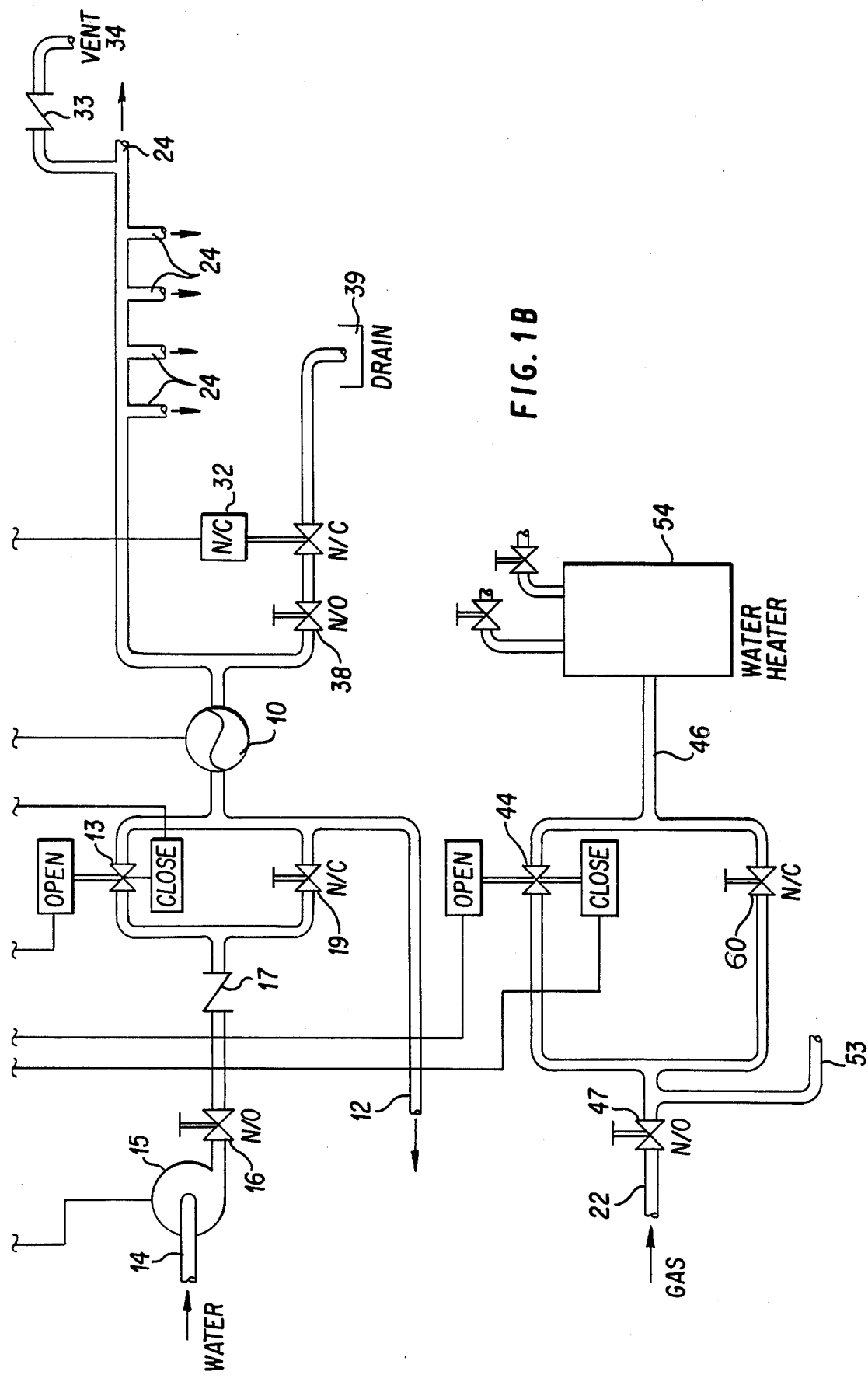

Referring now to the drawing, the automatic system, as operated in a residential dwelling or commercial building, uses the electrical current generated by the rotating electric pulse generator flow meter 10 to provide an input signal to the electronic solid state programmable controller 11. The electrical signal generated is proportional to the rate of flow and that multiplied by the time the flow is taking place yields the volume of fluid used in any time frame. Acting on this input the controller 11 can perform the functions programmed into it. Furthermore, in most cases the demand for fluids such as water are not continuous but rather flow occurs for specific periods of time to fulfill a specific function. A flushed toilet requires approximately 7 gallons of water to refill and about one minute of time. A person showering may require 30 gallons and 10 minutes. An ice maker refills with water in about 20 seconds and requires only an eighth of a gallon of water. An example of a longer duration would be the watering of a lawn. This extended flow can be addressed in two alternate manners. First, the programmable controller 11 may be by-passed by a push-button thereon signalling the controller to the "by-pass mode" while watering takes place, or the distribution line 12 serving the outside faucet or faucets may be located before or up stream from the flow meter 10 so that it is not included in the "flow monitor" system; it, however, would be protected from freeze damage by the freeze monitor system hereinafter described. Thus any time flow occurs for a continuous time longer than that provided in the programmer, no matter how slow, the device perceives a problem and causes the system to shut down by closing solenoid valve 13; twin solenoid latching valves of this type are VELCOR ENGINEERING Model SV 16 and SV 18. Alternatively, a sequentially operated two way single solenoid valve containing a permanent magnet latching circuit that is controlled by a momentary electrical current, such as SKINNER VALVE Model 2LG2LBG4150 with the magnelatch option, can be substituted for the twin solenoid latching solenoid valve 13. Whenever the programmer is set to "System Shut-off", either manually or automatically, valve 13 closes and shuts down the entire system including the "outside faucet" distribution system, i.e., fluid distribution line 12.

Another feature of this invention is the freeze protection component. Through the use of thermostat switches 57, saddle mounted onto the surface of the distribution system pipes, or thermisters, the temperature at specific critical points can be monitored and the switches caused to open at freezing temperature (32 degrees Fahrenheit at sea level for water) and shut down the system. The switches are physically installed in one of several critical points in the system piping where freezing is most likely to first occur. In this invention not only is the flow caused to turn off when freeze is imminent but the system automatically drains to keep ice from forming inside the pipes and bursting them. All this occurs after a warning buzzer alarm sounds in the controller 11 for a short time before shutdown. Pipe line freeze-up occurs most frequently when no flow is taking place in a particular part of the distribution network. The warning signal alerts the occupants to turn on the fluid at the critical faucet for slow flow to prevent freezing if they prefer that to the system automatically shutting off. Naturally, the freeze protection component need not be installed in warmer climates where pipe freezing is not a potential problem. Likewise, simpler less costly systems in cold climates may be installed utilizing the freeze damage prevention segment of this invention.

The programmable controller 11 may have multiple output signals that can function separately (at independent commands) or simultaneously depending upon how it is programmed. For example, the detailed description that follows describes how the controller may also turn off a water pump. It may likewise turn off the gas supply to a water heater or activate an alarm, or remote "system-off" indicator.

In total, the automatic control system of this invention serves to minimize water damage and loss from various malfunctions at anytime during the twenty-four hour life cycle through continuous system monitoring. It provides total prevention against freeze damage at all times, and when the water system is manually turned off at the controller 11, safeguards the building from any fluid damage for any reason. Another feature of this invention is that the controller 11 can be programmed to automatically shut off the system if the system has been limited in flow only to the demands of small product uses for a given number of hours, e.g., indicating that the system is unattended. In this situation, it automatically turns off the entire system. This is useful if the occupant or operator leaves for an unplanned time or forgets to turn the system off after leaving for an extended length of time.

In accordance with the preferred embodiment and best mode of the invention in a residential dwelling or a commercial building, water is supplied through service line 14, pressurized and pumped by pump motor 15 when the source is from a well rather than from a pressurized system. The water system has a service shut-off valve 16 which is manually closed whenever work is performed on the in-building system. Some municipalities require check valve 17 to prevent reverse flow back into the municipal water system. Double acting solenoid valve 13 is positioned to be open when under normal water system conditions the programmable controller 11 sends a timed electric signal via main power circuit 18. Being energized, current passes through relay 29 to energize the "open" coil on valve 13. This in turn causes valve 13 to be open and allow the passage of water.

Any adverse condition arising anywhere in the water system, by reasons to be described later, causes the controller 11 to send a different timed signal via signal circuit 21 to normally open relay 30. Electricity from main power 18 passes through relay 30, energizing the same, and causing the coil on valve 13 to close. Being de-energized, the valve shifts, closes, and stops the flow of water.

In the event of malfunction of controller 11, by-pass valve 19 can be manually opened so that the water distribution system can function while repairs are made. Furthermore, the loss of electricity in circuit 18 does not alter the status of the water system. If all is normal with the system at the time of power failure, valve 13 will remain in its open position since it is only energized momentarily to switch to that position. Likewise, if at the time of power failure the system is shut off, the water will remain off since valve 13 is closed.

Gas is supplied by line 22 and to the hot water heater 54 by programmable controller 11. Once the main gas shut off valve 47 is manually opened for normal service, flow of gas to the heater 54 is dependent upon the position of double acting gas flow solenoid valve 44; the VALCOR ENGINEERING Models SV 16 and SV 18 mentioned above can be used. Alternatively, a sequentially operated two way single solenoid valve containing a permanent magnet latching circuit that is controlled by a momentary electrical current, such as SKINNER VALVE Model 2LG2LBG4150 with the MAGNELATCH option, can be substituted for the twin solenoid latching solenoid valve 44. Manual valve 19, used as a by-pass in the event of controller 11 malfunction, is normally closed. When water service conditions are *normal,* valve 44 will be caused to be in the open mode by virtue of an initial timed electric control current having been sent from the controller 11 via circuit 41 to relay 42 which momentarily closes. When relay 42 closes, electricity from the main power circuit 18 flows through and energizes the "open" coil on gas valve 44 causing it to open.

Rotating electric pulse generator flow meter 10 provides an electrical signal via electric line 23 to the controller 11. The value of this signal is proportional to the rate of flow of water through flow meter 10 and the length of time it rotates. The number of pulses per unit of time determines the rate of flow, e.g., in gallons per minute, and the number of pulses counted by the programmable controller 11 in a given period of time measures the total volume used during any specific period.

In systems requiring a pump motor 15, any event that caused solenoid valve 13 to close will also cause the pump motor 15 to de-energize and stop. Under normal conditions, normally open relay 36 passes current from main power circuit 18 to the pump motor 15. When any adverse flow, or other shut-down signal, is received by controller 11, control circuit 35 is caused to de-energize which opens relay 36 and stops pump motor 15. A manual electric by-pass switch 58 can be closed to keep pump motor 15 running should controller 11 malfunction.

The freeze protection system of this invention is operated by sensing the temperature of the surface of certain sections of copper (or plastic) pipe in the distribution network 24. The accompanying diagram shows a plurality of thermostat switches 57 next to each other. They are actually located in various spots inside the building in unheated areas where the environmental temperature may cause water in pipes to freeze. For example, one may be saddle-attached to a pipe at the most distant point from the water service entrance or in the unheated crawl space of a house with no basement. Another may be in an unheated attic area where the cold water line may feed to a bathroom, or attached to a pipe in the outside wall, the north wall if there is more than one. To reduce the effect of the air temperature on thermostat switches 57, insulation should be wrapped around the pipe to cover the air side of the sensor so only the contact surface temperature influences the switch. To facilitate installation and optimize cost, the control transformer 25 reduces the voltage to 24 volts so that the signal wiring 26 and 50 may be of the low voltage type and size similar to door bell wiring and installation. When the pipe temperature at a thermostat switch 57 drops to freezing (32 degrees Fahrenheit at sea level), one or more of the thermostat switches 57 opens and interrupts the signal current in signal wiring circuit 50. This causes the controller 11 to act. A timed relay inside the controller 11 turns on a freeze warning indicator light 27 on the controller and activates a buzzer in the controller. After a designated time delay, if the condition has not abated by a person turning on a faucet to cause water to run slowly and the water temperature in the pipe to rise, the controller 11 will operate to cause a timed momentary current to flow in signal circuit 21, relay 30 closes and current from main power circuit 18 flows to operate the "closed" solenoid on valve 13 thereby shutting off the water supply. Simultaneously, output circuit 56 is energized for a designated duration and causes relay 31 to energize and close, which in turn energizes the small normally "closed" solenoid valve 32, opening it and allowing the system to empty through drain 39. Valve 32, also known as a ventor or drain valve, is physically located in a low spot in the system. For a system to drain it must be vented so that the pressure in the water distribution system drops to a negative atmospheric value, so check valve 33, which is normally held closed by the water system pressure, opens and allows air to vent in through vent 34. The system now drained of water is safe from bursting. Thus, after a programmed time of perhaps 15 minutes, output circuit 56 de-energizes, relay 31 opens and vent valve 32 again closes. Then when the freeze condition passes and switches 57 close, a current again passes along signal wiring 50 to the controller 11. The controller senses the change and momentarily sends current along control circuit 20 and sequentially causes valve 13 to open. A control current likewise travels to relay 36 causing pump motor 15 once again to run in systems requiring a pump.

Should solenoid valve 32 malfunction, and remain open though de-energized, manual valve 38 may be closed to allow the system to function. Also, during periods of power failure to main power circuit 18, drain valve 32 is closed.

The programmable controller 11 is equipped with a twelve button key pad 49 and an alphanumeric display 64. The display 64 sequentially instructs the programmer 11 on the valves to enter for the proper functioning of the system. The programmer 11 has a seven-day time chip and clock that can display the time on command. The display 64 instructs the programmer on how to set the clock and day of the week.

Besides setting a seven-day cycle, the controller 11 is programmed for four operating modes. The first mode is "system down" or controls off. In this instance, the main on/off switch 48 on the controller 11 is "off". This same condition is duplicated when there is a power failure and no voltage or current is on circuit 18.

The second mode is "system shut-off". Indicator light 55 signals this condition. In this mode, circuit 35 is de-energized, circuit 41 is de-energized, and circuit 56 is de-energized, unless momentarily energized by a pipe freeze condition. Signal circuit 21 momentarily energizes at the start of this condition and causes valve 13 to close. The gas service distribution system 53 to the heating furnace, gas lights and so forth is not affected. However, gas line 46 to the hot water heater 54 can be turned off at the programmable controller 11 by external command. Upon this command a momentary current is sent by the controller 11 along circuit 43 which in turn closes relay 45 causing gas flow solenoid valve to close. Indicator lamp 52 illuminates to indicate the "hot water off" condition.

This second mode condition can be implemented by command upon personal instruction at the controller 11 for reasons of vacation, overnight or extended absence from home, system testing, extraordinary security desires, or the like. An unprogrammed flow of the water system can be caused by a leak resulting from any of the aforementioned reasons, including running water for home use at any rate or length of time not allowed for or programmed for in the controller 11. A water system shut-off would be caused by a continuously running water closet (toilet), a shower bath at midnight, if not programmed, a running water hose if the outside hose bibbs are a part of distribution network 24, rather than the optional line 12, and so forth.

Also in the "shut-off" mode, the controller 11 may be programmed to automatically momentarily activate control circuit 43 to cause the gas line 46 to the heater 54 to turn off either as soon as the system "shuts-off", after a programmed delay of up to a few days, or not at all so that gas can be turned off by external command.

The "shut-off" mode may be terminated at any time by manually switching off the controller 11 to "system down" mode described above in which case all security and automation is inactivated or by pushing the "reset" button on the controller 11. The controller 11 will automatically convert into "system monitoring" mode. Should the system still be in fault by virtue of a pipe leak or unprogrammed flow, the controller 11, after a short duration, will automatically reverse back to the "shut-off" mode.

The third operating mode, "system monitoring", is the normal condition of the fluid control system. When all piping is secure and the monitored flow is within norms this mode will continue.

The fourth and final mode is "Monitor by-pass". This is accomplished only by external command, i.e., by pushing the "by-pass" button on controller 11. An indicator light 51 signals this condition. Once set, the "by-pass" remains in effect for a fixed period of time, e.g., eight hours, after which time the controller 11 automatically switches back to "system monitoring". The purpose of "by-pass" is to allow for unprogrammed use that may occur. During the "by-pass" mode the freeze damage prevention segment of the system remains active so it is only the flow and volume monitoring and control that is by-passed.

In geographic areas subject to winter freezing, a further hazard to in-building pipe freezing can arise from extended heat system failure caused by either electric power outage or furnace malfunction. In such cases the controller 11, being equipped with a battery back-up, can cause solenoid valve 13 to close and valve 32 to open when the temperature at the controller 11 falls to approximately 40 degrees Fahrenheit, thereby shutting off the water and simultaneously draining the system.

While the above mentioned valve 44 functions as auxiliary control means to a gas supply, i.e., gas line 22, it can also function as an auxiliary control for on/off or proportional control of an electric process heater (e.g., hot water heater) and other fluid or gas related systems such as steam, oil distribution, fuel or chemical processing or supply systems, and the like.

The Programmable controller 11 is central to the performance of the total water loss damage control and freeze damage prevention system. To program, a microprocessor chip such as INTEL 8048, INTEL 8052 or MOTOROLA 68 HCll can be used. Some of the features and capabilities of the controller are hereinafter described:

(1) The controller 11 of the invention operates using 24 volt AC or DC voltage power input to make installation similar in complexity to the installation of the normal heating and air conditioning thermostat controls of a modern home;

(2) The controller 11 is an electronic solid state microprocessor with several megabytes of memory for program instruction and information storage. It has eight independent outputs ot perform the functions hereinafter described. Since time is a required dimension, a seven-day clock microprocessor chip is integrated into the electronics. The controller 11 can have, but is not limited to, a single 32 segment LCD alphanumeric digital display 64 and a 16 button key pad 49. A built-in automatically rechargeable battery provides emergency power and performs switching functions previously described during prolonged service power outage and to retain programmed memory;

(3) There are two input signals to the programmable controller 11;
  (a) from the flow meter 10; and
  (b) from the low voltage freeze protection circuit, signal wiring 26 through the thermostat switches 57 via signal wiring 50 to the controller.

(4) The information from the water system required by the controller 11 and forming the basis for the output commands is derived from the fact that fluid systems usually do not flow continuously. The flow is cyclically intermittent and within reasonably predictable rates of flow (In a commercial building the water flow may be continuous over perhaps a tweve-hour duration, but during the non-occupied, or sleeping night hours, the flow becomes intermittent.);

(5) The program of controller 11 may include the capability to record and store information on the rate of flow and volume required by each water using device in a building. With no flow, the controller 11 can be instructed to record the volume, rate and total time a toilet, for example, requires to flush and refill, or a dishwasher water usage pattern, total consumption and length of time and maximum flow rate, or how fast a bathroom faucet flows, and so forth;

(6) The recorder segment of the memory makes possible the ability to establish a flow rate, volume, and time profile of the system to be controlled. This profile along with operator-added data can be the basis for establishing system operating norms. As described before, deviations beyond established norms and tolerances become the basis for the controller 11 to instruct the system to shut down as previously described;

(7) To simplify operating instructions the controller 11, when first switched on by switch 48 and a specified begin button pushed on key pad 49, starts instructing the operator via the alphanumeric display 64. The instruction displayed will the operator to (a) flush a toilet, (b) fill the washing machine with water, (c) run the dishwasher, and so forth. Next, it will instruct on how to set the clock and the day of the week. Additionally, it will ask between what hours the washing machine is used, between what hours the dishwasher is used, or how may times after sleeping hours begin the user expects to flush the toilet or get a drink of water.

(8) The controller 11 is of a size convenient for mounting on a wall, and is designed for installation adjacent to the heat system thermostat;

(9) A secondary remote security key "water system shut-off" switch 59, provides for optional exterior remote-system "shut-off" for reasons of fire, smoke, or fumes which might prohibit access to the controller 11.

The foregoing is considered as illustrative only of the principles of the invention. Further, since numerous modifications and changes will readily occur to those skilled in the art, it is not desired to limit the invention to the exact fluid medium, construction and operation shown and described, and accordingly, all suitable modifications, and equivalents which may be resorted to, fall within the scope of the invention.

What is claimed is:

1. A fluid loss and damage control system for a fluid distribution system comprising:
   (a) system control means for receiving input data on fluid flow and pipe temperatures in the fluid distribution system, processing said data and providing output control signals to valves in the distribution system responsive to programmed limit conditions, said control means comprising a programmable controller settable for operating various parameter conditions simultaneously or independently;
   (b) flow sensing means in the fluid supply line for sensing flow in the line and providing an input signal to the controller proportional to the rate of flow in the line for controlling fluid flow through the distribution system;
   (c) temperature sensing means for sensing the temperature at points along the fluid distribution system of the facility providing a signal to the controller when the temperature at a point in the system approaches freezing;
   (d) fluid supply control means for controlling the fluid supply to the distribution system, said fluid supply control means located adjacent to the main supply shut-off valve and said fluid supply control means operated by a signal provided by the controller:
   (e) auxiliary control means for controlling a gas distribution system said auxiliary control means being controlled by signals provided by the controller, said auxiliary control means including a gas heater control means;
   (f) drain means for draining the distribution system, said drain means installed at desired points of the distribution system and controlled by signals provided by the controller;
   (g) means for providing an audible and visual alarm when the system controller senses an out-of-limit condition of flow or temperature in the fluid distribution system, so that when the control means receives a flow signal from the flow sensing means for a period which exceeds a programmed limit it transmits a signal operating said fluid supply control means to a closed position and said heater control means to an off position for shutting off the gas supply to the gas distribution system, and when the system control means receives a signal from the temperature sensing means which indicates that a freezing condition is present it operates said fluid supply control means to a closed position for shutting off the fluid flow to the distribution system and simultaneously operates said heater control means to an off position for shutting off the gas supply to the gas distribution system and said drain means to an operative position for allowing the system to drain and,
   (h) manual over-ride means for maintaining said fluid and gas distribution systems and drain means operative in the event of electrical power failure.

2. A fluid loss and damage control system for a fluid distribution system as described in claim 1, wherein the fluid is water.

3. The system of claim 1 wherein the flow sensing means comprises a flow meter providing an electric signal proportional to fluid flow to the controller.

4. The system of claim 1 wherein the temperature sensing means comprises a plurality of thermostatic switches installed in series on the distributing system lines which are operable to an open position when the temperature approaches freezing and providing a signal to the controller.

5. A fluid loss and damage control system for a fluid distribution system as described in claim 1, wherein the temperature sensing means comprises a plurality of thermisters installed in series on the distributing system lines which are operable to an open position when the temperature approaches freezing and providing a signal to the controller.

6. The system of claim 1 wherein the fluid supply control means comprises a dual coil solenoid valve operable to an open position by applying a current to one coil of the valve and to a closed position by applying a current to the other coil of the valve for controlling the flow of fluid through the line.

7. The system of claim 1 wherein the fluid supply control means comprises a sequentially operated two-way single solenoid valve operable to an open position by an initial pulse applying current to the coil of the valve and to a closed position by a second pulse applying current to the same coil of the valve for controlling the flow of fluid through the line.

8. The system of claim 1 wherein the related system controlled by the auxiliary control means is a hot water distribution system.

* * * * *